Dec. 21, 1937.  W. F. EISENHAUER  2,102,890
SPRING COVER
Filed Oct. 8, 1935  3 Sheets-Sheet 2

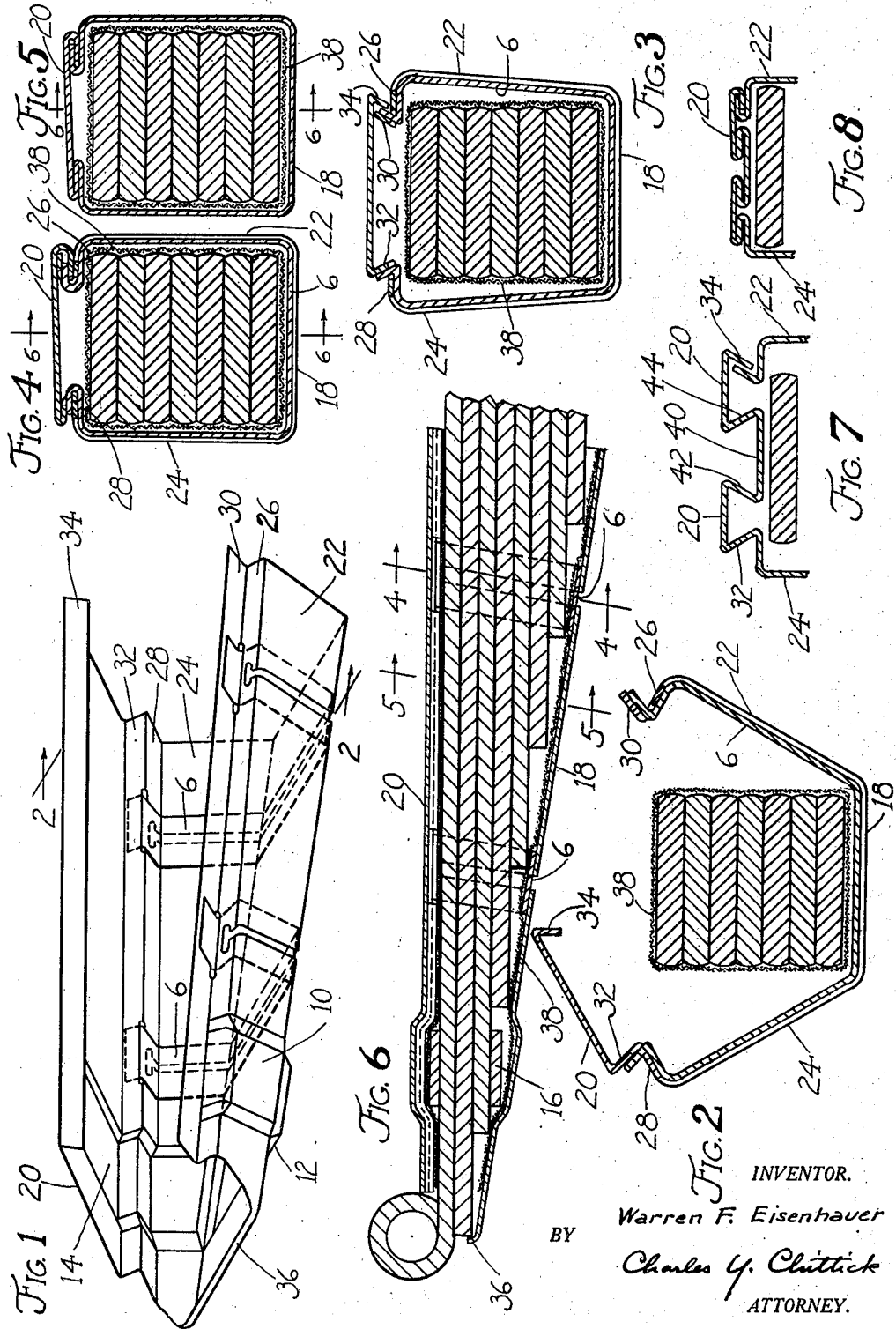

INVENTOR.
Warren F. Eisenhauer
BY
Charles Y. Chittick
ATTORNEY.

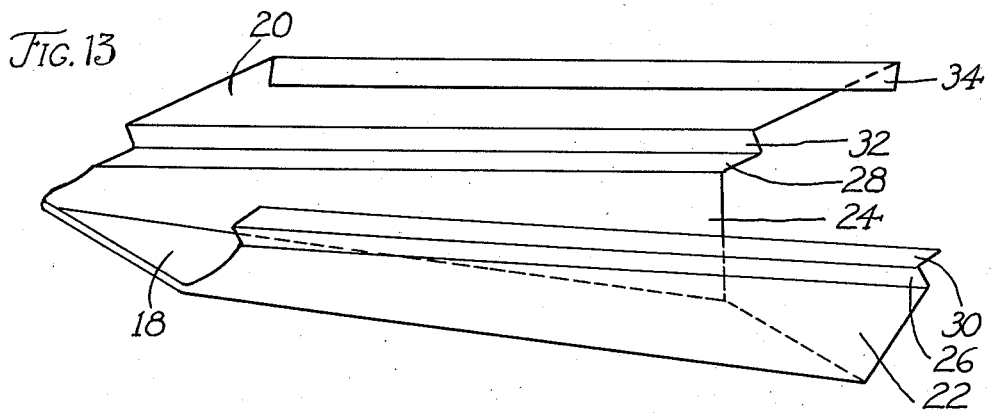
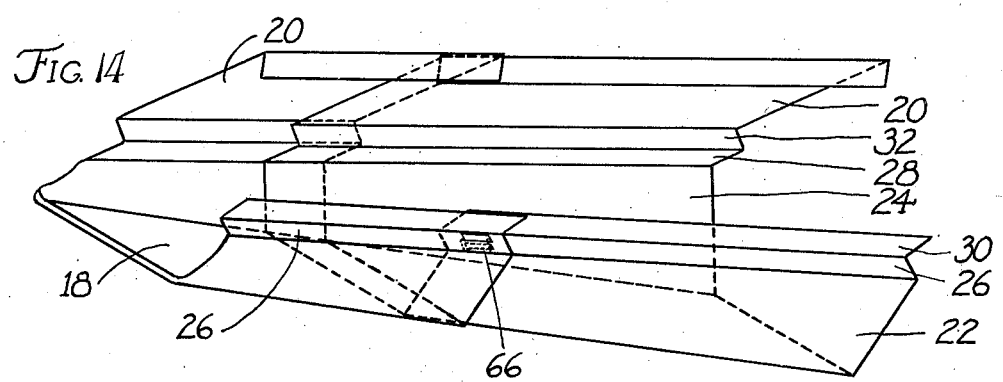
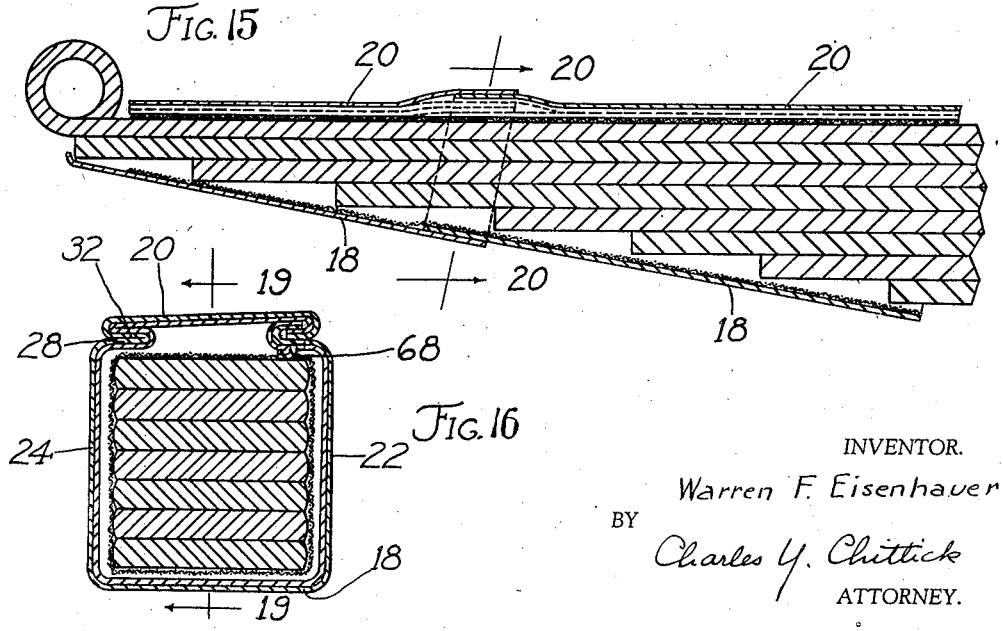

Patented Dec. 21, 1937

2,102,890

UNITED STATES PATENT OFFICE 2,102,890

SPRING COVER

Warren F. Eisenhauer, Watertown, Mass., assignor, by mesne assignments, to F. L. Jacobs Company, Detroit, Mich., a corporation of Michigan Application October 8, 1935, Serial No. 44,034

11 Claims. (Cl. 267—37)

This invention is concerned with multiple leaf springs such as commonly used on automotive vehicles. More particularly this invention is concerned with providing a new and improved casing for such springs whereby dirt and water may be excluded from the spring and at the same time lubricants or other spring stabilizing materials may be maintained on and between the spring leaves within the casing.

Another object of my invention is to provide a casing in the form of a unitary structure which may be easily applied to the spring and simply secured in position.

Another object of my invention is to provide a casing in the form of a unitary structure so constructed that it automatically tightens itself about the spring as it is being pressed into its final sealed position. A still further object of my invention is to provide a spring casing which, after being positioned and secured loosely on the spring, may thereafter be permanently secured by a minimum number of operations.

Other features and objects of my invention will become apparent to those skilled in the art as the invention is more particularly described hereinafter with the aid of the drawings in which Fig. 1 is a perspective view of my casing in open position prior to application to a spring.

Fig. 2 is a cross-sectional view on the line 2—2 of Fig. 1 after the casing has been loosely positioned on the spring.

Fig. 3 is a cross-sectional view on the line 2—2 of Fig. 1 after the locking flanges have engaged each other to loosely secure the casing.

Fig. 4 is a cross-sectional view on the line 4—4 of Fig. 6 showing the casing tightened about the spring and permanently secured thereon, with the slot covers secured by the clamping action of the flanges.

Fig. 5 is a cross-sectional view on the line 5—5 of Fig. 6, being similar to Fig. 4, but at another secton.

Fig. 6 is a longitudinal, cross-sectional view of the casing on the line 6—6 of Figures 4 and 5.

Fig. 7 is a fragmentary cross-sectional view showing a modification of my construction to give greater contraction if desired.

Fig. 8 shows the structure of Fig. 7 in contracted and secured position.

Fig. 13 shows a one-piece spring casing incorporating my invention but having no flexing means. In this construction the casing is of such depth that the spring may flex within.

Fig. 14 shows my invention adapted for use on a spring casing composed of a plurality of sections the ends of which are telescoped and fastened so that the casing may be considered a unitary structure.

Fig. 15 is a longitudinal cross-sectional view of the casing shown in Fig. 14 when in position on a spring.

Fig. 16 is a cross-sectional view on the line 20—20 of Fig. 15.

To show adequately the construction, the thickness of the casing has been exaggerated in the cross-sectional views.

Figure 9:
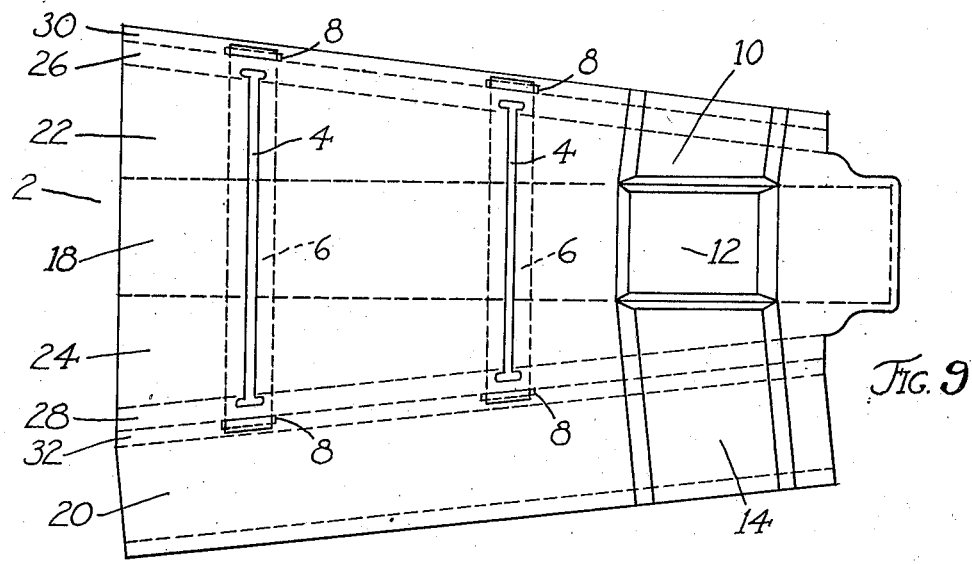
Fig. 9 shows the blank prior to being formed as in Fig. 1. The slot covers may be positioned prior to forming.

Referring now to the drawings, in Fig. 9 is shown a blank 2 stamped from any suitable material, but preferably of thin sheet metal having such properties as to permit its being formed readily. Transverse slots 4 are punched in the blank. These slots are of such length that when the blank is formed into a casing, the slots will extend around at least three sides of the spring. Positioned over the slots are the slot covers 6 which may be secured in any convenient way. In the form shown they are held in position by having their ends tucked through narrow longitudinal slots 8. The slots 8 may be spaced a slight distance away from the transverse slots 4, as shown, or the transverse slots 4 may extend to the slots 8. The method of securing the covers 6 over the slots 4, however, does not constitute part of this invention. Portions 10, 12 and 14 are suitably embossed to provide clearance for the spring clip 16, shown in Fig. 6. In a manner well known to the art, the blank 2 is then bent and formed at suitable places and by suitable means until it reaches the form shown in Fig. 1, a cross-section of which is shown in Fig. 2. The bottom portion of the casing 18 is usually positioned against that side of the spring having the stepped leaves, as shown in Fig. 6 so that the cover portion 20 will lie along the main leaf of the spring.

The casing when formed as in Fig. 1, has in addition to the bottom portion 18 and the cover portion 20, sides 22 and 24 terminating in the portions 26 and 28 respectively, which latter portions are substantially at right angles to the sides. Extending upwardly from portion 26 at an acute angle thereto, is the flange 30. Extending upwardly from portion 28, but at an acute angle thereto is the connecting flange or slack take-up means 32 connecting 28 with the cover 20. Depending from the cover 20 at its edge is the flange 34 which is adapted to engage flange 30, as shown in Fig. 3. Positioned within the casing are the slot covers 6, as shown in Figures 1, 2, 3, 4 and 6.

At the small end of the casing is a turned-up portion 36 which partially covers the end of the leaf adjacent the main leaf. This serves as an additional seal to prevent the entrance of dirt and water and also helps to prevent the escape of lubricating or stabilizing compounds contained within the casing.

In applying the casing to the spring, it is customary to first spread on and between the spring leaves a lubricating or stabilizing compound and to wrap thereabout a fabric covering, as shown at 28, Figures 2, 3, 4, 5 and 6. This fabric covering or liner assists in minimizing the escape of the lubricating or stabilizing compound as well as reducing the play between the casing and spring. However, it is clear that the liner 28 could be dispensed with without in any way affecting the operation of my casing.

Figure 10:
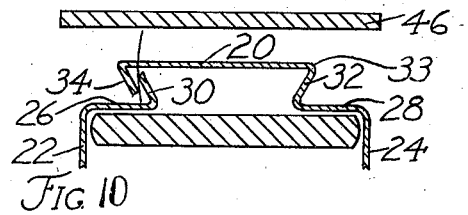
Figures 10 to 12 are fragmentary cross-sectional views showing the additional contracting ability of my casing.

To facilitate applying the casing, it is preferable that the spring be flexed until the main leaf is practically straight, as shown in Fig. 6. The casing is positioned on the spring by passing it over the latter, the spring slipping through the space between flange 34 and flange 30. This results in the casing assuming the position shown in Fig. 2. While supporting the bottom 18 of the casing against the leaves, the sides 22 and 24 are pressed together until they are substantially vertical. When they have reached this position, the flange 34, due to the angularity of flanges 30 and 34 with respect to portions 26 and 28 and sides 22 and 24, will have slid up and over flange 30, snapping into position behind flange 30, as shown in Fig. 10. Thereafter the bottom support and the side-pressing means may be removed, allowing the sides 22 and 24 to spring outwardly to the position shown in Fig. 3 and Fig. 11. In this position the casing, while relatively loose on the spring, is nevertheless self sustaining and no further holding or clamping is necessary while the cover 20 is being forced downwardly to the position shown in Figures 4 and 5.

Figure 11:
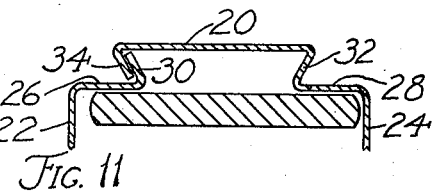

When the casing is in the position shown in Fig. 3 and Figure 11 it is relatively loose on the spring since the sides 22 and 24 have sprung slightly apart when the pressure thereon was released. However, although loose, the cover is secure because flange 30 has nested within flange 34 of the cover 20, but it is apparent that by squeezing sides 22 and 24 together it would be possible to disengage flange 34 from flange 30, thereby permitting the casing to be removed. To prevent this happening it is necessary to crimp flanges 30 and 34 together. In so doing, by my novel construction not only is the casing sealed longitudinally by means of the flanges, but also the sides 22 and 24 are drawn inwardly by the flanges and the slack take-up means to cause the casing to fit closer about the spring. By properly adjusting the angularity of the reversely turned portion 32 with relation to side 24, portion 28 and cover 20, it is possible, upon forcing cover 20 downwardly against the main leaf of the spring by means of a tool or plate moved normally with respect to the spring leaves or by means of a roller moved longitudinally of the spring leaves to cause portions 26 and 28 to move inwardly to the position shown in Figures 4, 5 and 12, thus drawing the sides 22 and 24 snugly against the sides of the spring leaves.

Attention is called to Fig. 10 which shows a very desirable feature of my invention. Because of the angularity and size of the slack take-up means with respect to portion 28 the cover 20, when in the position shown in Fig. 10, is substantially parallel to the spring leaves. To reach this position the sides 22 and 24 have been pressed against the edges of the spring leaves causing flange 34 to engage and slide upwardly over flange 30, the cover 20 during this action, pivoting about the corner 33. Under such conditions, when flange 34 snaps by flange 30 it will move downwardly, following the arc shown in Fig. 10 to take a position slightly under flange 30. This arrangement is of advantage in that it minimizes the amount of take-up necessary by the combined actions of the engaging flanges 30 and 34 and the take-up means 32.

Figure 12:
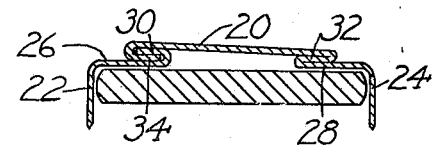

With respect to the angle of the take-up means and flange it has been found that the angle should not exceed approximately 60° lest the material buckle when being forced downwardly by the plate or tool 46 to assume the final position shown in Fig. 12. In practice, an angle somewhat smaller than 60° is preferable if the take-up afforded by the flanges and take-up means, when set at the smaller angle, is sufficient to draw the cover about the spring as tightly as required.

By my construction, therefore, I eliminate the necessity of handling and positioning two pieces to form the casing as shown by the patent to Skok, 1,284,482 and the necessity for successive bending operations to adequately secure the flanges as disclosed by the patent to Whitehouse 1,808,332. Likewise, a tightly fitting cover, as shown by Kuechle, 1,893,950, is provided without the necessity of multiple bending operations on the engaging flanges. My cover, as pointed out above, improves on the construction shown by Ferguson et al., 1,925,047 as to the number of bending operations necessary with their construction shown in Figures 1, 2 and 3 and as to the tightness of the cover with respect to their construction shown in Figures 4 and 5. Likewise, my construction is an improvement over that shown by Crist, 1,925,713, whose flanges cannot be automatically engaged and after engagement as in Fig. 5 cannot be folded to the position of Fig. 8 by a one-directional operation. The disclosure of Fig. 10 of Chesley 1,981,221 is also improved upon as this construction requires multiple bending operations to close the engaging flanges.

Thus, I have provided a spring casing of unitary construction which may be easily positioned on a spring, automatically locked in position and thereafter permanently secured. Having the casing of one piece facilitates handling, cuts down the number of operations necessary in applying the casing to a spring and in situations where large numbers of springs are being covered the saving in time is material. Again, in the application of my casing, it is clear that it may be applied either by hand or by machine. If it is applied by machine, no complicated mechanism is necessary; all that is needed is a support to hold the bottom 18 against the spring while the sides 22 and 24 are squeezed together. Cover 20 is at such angularity with relation to side 24 that the flange 34 slides up and over flange 30, dropping in position on the far side. Thereafter the bottom support and the side pressing members may be removed and the casing permanently secured in place and sufficiently contracted about the spring by the simple operation of pressing downwardly on cover 20 until the parts are as shown in Figures 4 and 5.

After the casing has been fixed on the spring, the spring is released from the position shown in Fig. 6 and assumes its normal curvature. Obviously the cover 20 will flex with the spring. The sections move toward or away from each other as the spring is flexed, this being permitted by the presence of the transverse slots 4 which extend around three sides of the spring. The slot covers 6 are of sufficient width to cover the slots 4 regardless of the width of the slot as determined by the extent of the flexing.

My casing is adaptable to any length spring, the necessary flexibility being provided by a suitable number of transverse slots 4. If desired, the slot covers 6 may be omitted entirely in which case reliance is placed upon the fabric liner to prevent the escape of the confined lubricating or stabilizing compounds.

By having all of the flexing sections of my casing integrally connected with the cover on one edge and clamped to the cover at the other edge, longitudinal displacement of the sections along the spring with relation to each other as well as to the cover is impossible. That is to say, once the cover is clamped in place all portions thereof of necessity maintain their positions with relation to each other. In this way free flexing of the cover is maintained throughout its life as the various parts cannot become misplaced to jam one on the other.

It should also be pointed out that my invention is, of course, applicable to a casing having no flexing slots or movable sections which are unnecessary if the depth of the casing is sufficient to permit the spring to flex therein. Such a casing is shown in Fig. 13 in which the various parts have been numbered to agree with those of Fig. 1. A casing without flexing slots or relatively movable sections would not ordinarily be used on a spring unless the movement of the spring were very slight.

In Fig. 14 is shown a flexible casing made of independent sections, the ends of which are telescoped and secured against separation by the clip 66. This clip is formed by driving a piercing tool through the overlapping portions 26 to form a pair of tongues which are thereafter bent back upon themselves as at 68 in Fig. 16. In the construction of Fig. 14 the covers 20, while not one-piece, are relatively immovable with respect to each other when in position on the spring. The bottom and two sides of the two sections, however, are free to move with respect to each other as the spring within the casing is flexed.

In Figures 7 and 8 is shown an alternative form of cover construction which may be used if greater contraction of the sides 22 and 24 is necessary. In most cases the contractive action of portion 32 and flanges 30 and 34, when compressed as in Figures 4 and 5, is sufficient to draw sides 22 and 24 snugly against the spring leaves. In certain cases, however, extra constraction may be desirable or necessary and to that end I provide a depressed rib portion 40 running longitudinally of the cover and connected therewith by portions 42 and 44, which portions are so angularly disposed with relation to rib 40 and cover 20 that the entire structure will assume the form shown in Fig. 9 when it is suitably pressed. By this means the walls 22 and 24 may be contracted a greater amount.

The foregoing explanation of my invention and the drawings are to be taken as illustrative only, and I do not intend my invention to be limited to the specific form disclosed, but rather as defined by the appended claims.

I claim:

1. A one-piece spring casing comprising spaced sections engaging three sides of a spring, a cover for the fourth side integrally connected with said sections by a slack take-up device, said sections also integrally connected with a reversely turned flange on said fourth side, a complementary flange on said cover to engage said reversely turned flange, said flanges arranged to bindingly engage each other and said take-up device arranged to draw said sections closer about said spring when said cover is moved toward said spring.

2. A one-piece spring casing comprising a series of spaced sections each having a bottom portion and diverging sides, said sides integrally connected along their edges by longitudinally extending portions, a reversely turned flange connected with one portion and a reversely turned slack take-up means connected with the other portion, a flange edged cover connected to said take-up means and at substantially right angles to one of said sides, said sides and cover of such dimensions to cause said flanges to slide one over the other and thereafter interlock when said sides are moved to a position substantially at right angles to said bottom.

3. A casing for a spring comprising a body and a cover integrally connected by slack take-up means in the form of a reversely turned portion at one side of the body, said cover and body having flanges adapted for longitudinal engagement for closing and contracting said cover about the spring, the angle of said flanges and reversely turned portion with respect to said cover being substantially the same, said flanges and reversely turned portion when flattened against said spring acting to contract said cover substantially the extent said flanges overlap when said body is forced against the sides of said spring prior to locking said flanges.

4. A spring casing having longitudinally extending flanges adapted to make automatic engagement with each other when two sides of said cover are pressed toward said spring and take-up means including said engaging flanges operable when actuated by a one-directional force to draw said two sides to a position substantially that at the time of said automatic engagement.

5. A one-piece spring casing comprising a channel-shaped section for enclosing at least three sides of a spring and having out-turned edge flanges at the fourth side of the spring, said section being provided with a plurality of transverse flexing slots and a cover integrally connected with one of said out-turned edge flanges to form a slack take-up device and having a flange to engage said other out-turned edge flange to secure the casing on the spring.

6. A one-piece spring casing comprising a series of spaced sections each having a bottom portion and diverging sides, one set of said sides integrally connected to a reversely turned flange on one side of said casing and the other set to a reversely turned slack take-up means at the other side of the casing, a flange edged cover connected to said take-up means and an interlocking joint between said cover and said reversely turned flange and at substantially right angles to one of said sides.

7. An articulated one-piece casing for a leaf spring comprising relatively movable sections extending around three sides of the spring and beyond the edges of the fourth side, a cover for the fourth side integrally connected to the sections by a slack take-up means the angle between said cover and means being substantially 55°, and the angle between said means and sections being substantially 55°.

8. A one-piece spring casing according to claim 7 in which the sections are integrally connected along the fourth side to a reversely turned flange and a complementary flange extends along the edge of the cover, the angles between said first flange and sections and between said second flange and cover being substantially 55°.

9. A one-piece articulated spring casing comprising relatively movable sections extending around three sides of the spring and a portion of the fourth, a cover for the fourth side extending substantially the width of the fourth side, said cover integral with said sections, connecting means for said cover and sections, and slack take-up means, both said means being at the edges of said cover and concealed when said casing is affixed to the spring.

10. A casing for a leaf spring comprising a body and a cover integrally connected, means for locking said casing about a spring comprising reversely turned flanges on the body and cover, and take-up means for tightening up said casing on said spring comprising a deformable portion adapted upon deformation thereof to place said casing under tension.

11. A unitary articulated spring casing comprising relatively movable sections extending around three sides of the spring and a portion of the fourth, said sections connected on said fourth side to prevent relative movement on said fourth side only, overlapping covers for the fourth side integral at one longitudinal edge with said sections and extending substantially the width of the fourth side, a slack take-up means along said longitudinal edge and a separable fastening means along the other longitudinal edge.

WARREN F. EISENHAUER.